United States Patent [19]

Shimizu et al.

[11] Patent Number: 5,669,012

[45] Date of Patent: Sep. 16, 1997

[54] DATA PROCESSOR AND CONTROL CIRCUIT FOR INSERTING/EXTRACTING DATA TO/FROM AN OPTIONAL BYTE POSITION OF A REGISTER

[75] Inventors: Toru Shimizu; Shunichi Iwata; Toshio Doi; Shigeo Mizugaki, all of Itami, Japan

[73] Assignee: Mitsubishi Denki Kabushiki Kaisha, Tokyo, Japan

[21] Appl. No.: 720,455

[22] Filed: Sep. 30, 1996

Related U.S. Application Data

[63] Continuation of Ser. No. 245,792, May 19, 1994, abandoned.

[30] Foreign Application Priority Data

May 21, 1993 [JP] Japan ................... 5-120014

[51] Int. Cl.⁶ ................................................ G06F 9/35
[52] U.S. Cl. .................. 395/800.01; 395/376; 395/384; 395/390; 395/611; 395/670; 395/898; 364/DIG. 1
[58] Field of Search ........................... 395/611, 376, 395/670, 800, 384, 390, 898; 364/DIG. 1

[56] References Cited

U.S. PATENT DOCUMENTS 5,121,474  6/1992  Sakamura et al. ................ 395/800
5,349,681  9/1994  Yoshida et al. ................... 395/800
5,386,580  1/1995  Yoshida et al. ................... 395/800
5,396,610  3/1995  Yoshida et al. ................... 395/425

OTHER PUBLICATIONS

*Am29000 User's Manual*, Advanced Micro Devices, 1987.

Primary Examiner—Alyssa H. Bowler
Assistant Examiner—Dzung C. Nguyen
Attorney, Agent, or Firm—Lowe, Price, LeBlanc & Becker

[57] ABSTRACT

A data processor being provided with a microdecoder which decodes instruction codes comprising two operation code parts, a source operand specifying part and a destination operand specifying part, wherein an optional bit area of source data (a register of a general register file or a memory) is inserted in an optional bit area (determined by the value of the first operation code part) of a destination register according to the decoding result, and an optional bit area (determined by the value of the second operation code part) of a source register is extracted and stored in an optional bit area of destination (a register of the general register file or the memory), thereby making it possible to "process the insertion and extraction operations to and from optional byte positions of registers" at a high speed with short instruction code size.

17 Claims, 18 Drawing Sheets

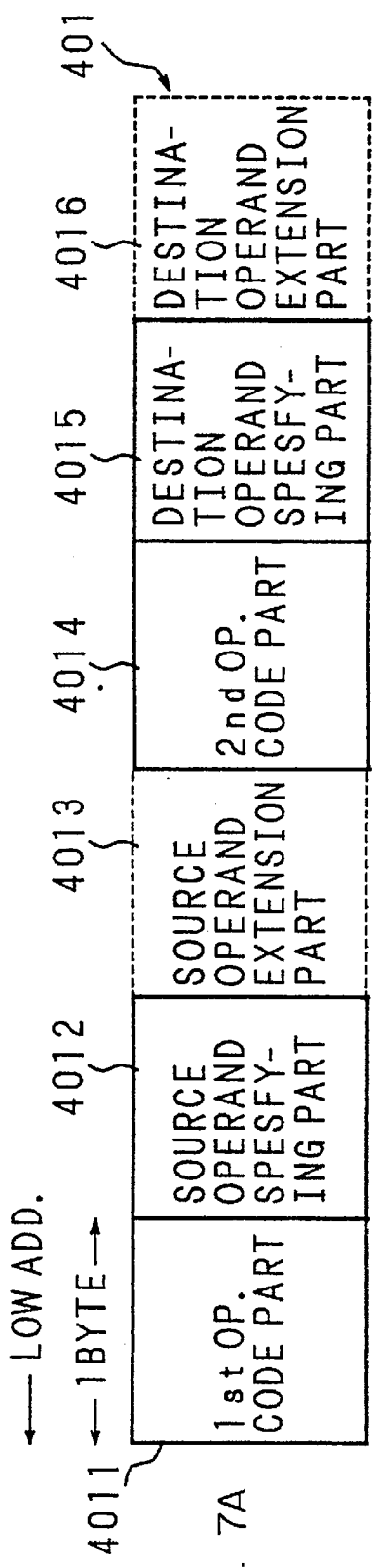

Fig. 8A  REG. DIRECT: `0001 | Rn` — 411

Fig. 8B  REG. INDIRECT: `0011 | Rn` — 412

Fig. 8C  16 bits REG. RELATIVE INDIRECT: `0010 | Rn | RELATIVE VALUE (16bits)` — 413

Fig. 8D  32 bits REG. RELATIVE INDIRECT: `0100 | Rn | RELATIVE VALUE (32bits)` — 414

Fig. 8E  16 bits ABSOLUTE: `0000 | 1001 | ADD. VALUE (16bits)` — 415

Fig. 8F  32 bits ABSOLUTE: `0000 | 1010 | ADD. VALUE (32bits)` — 416

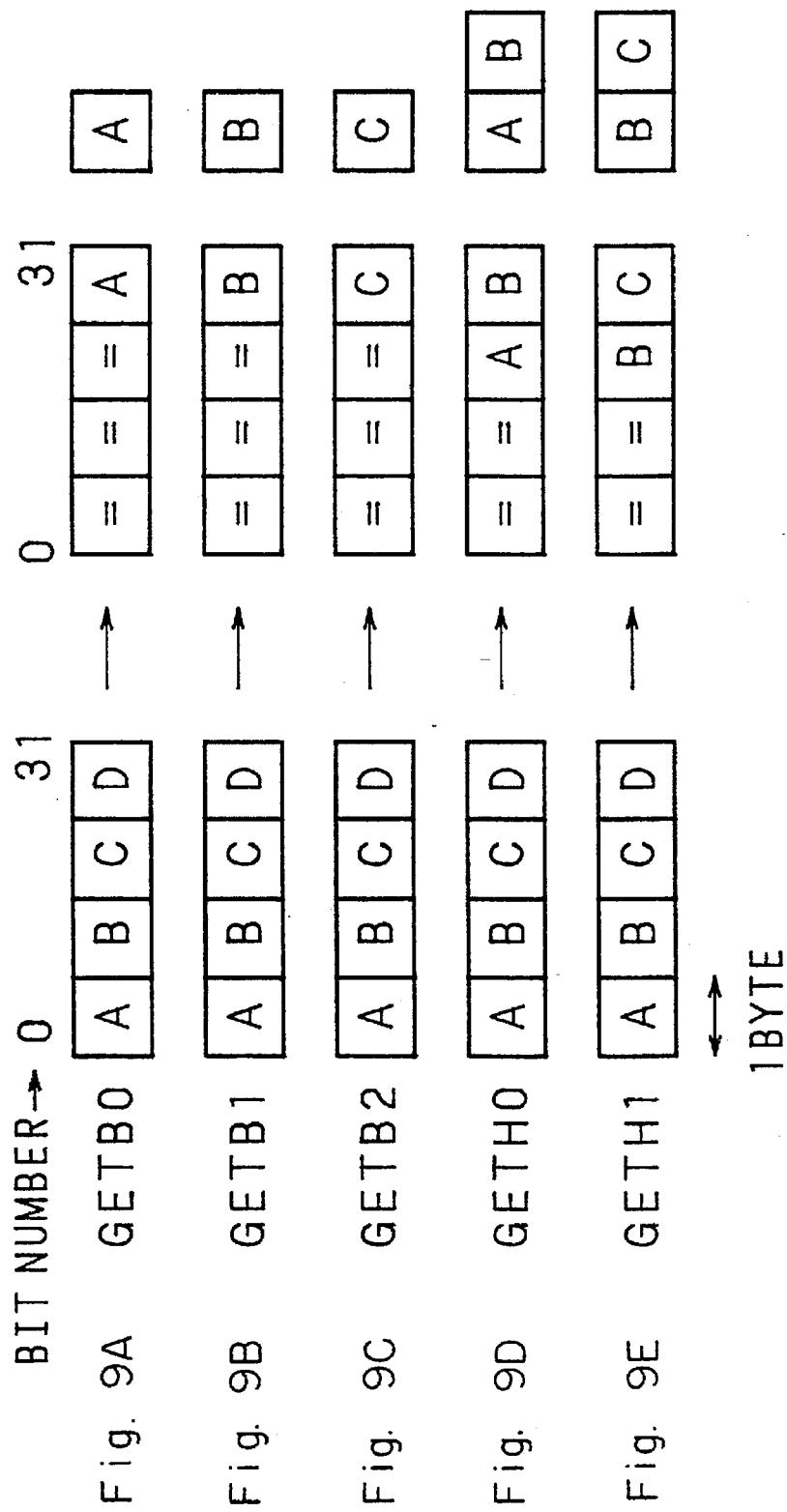

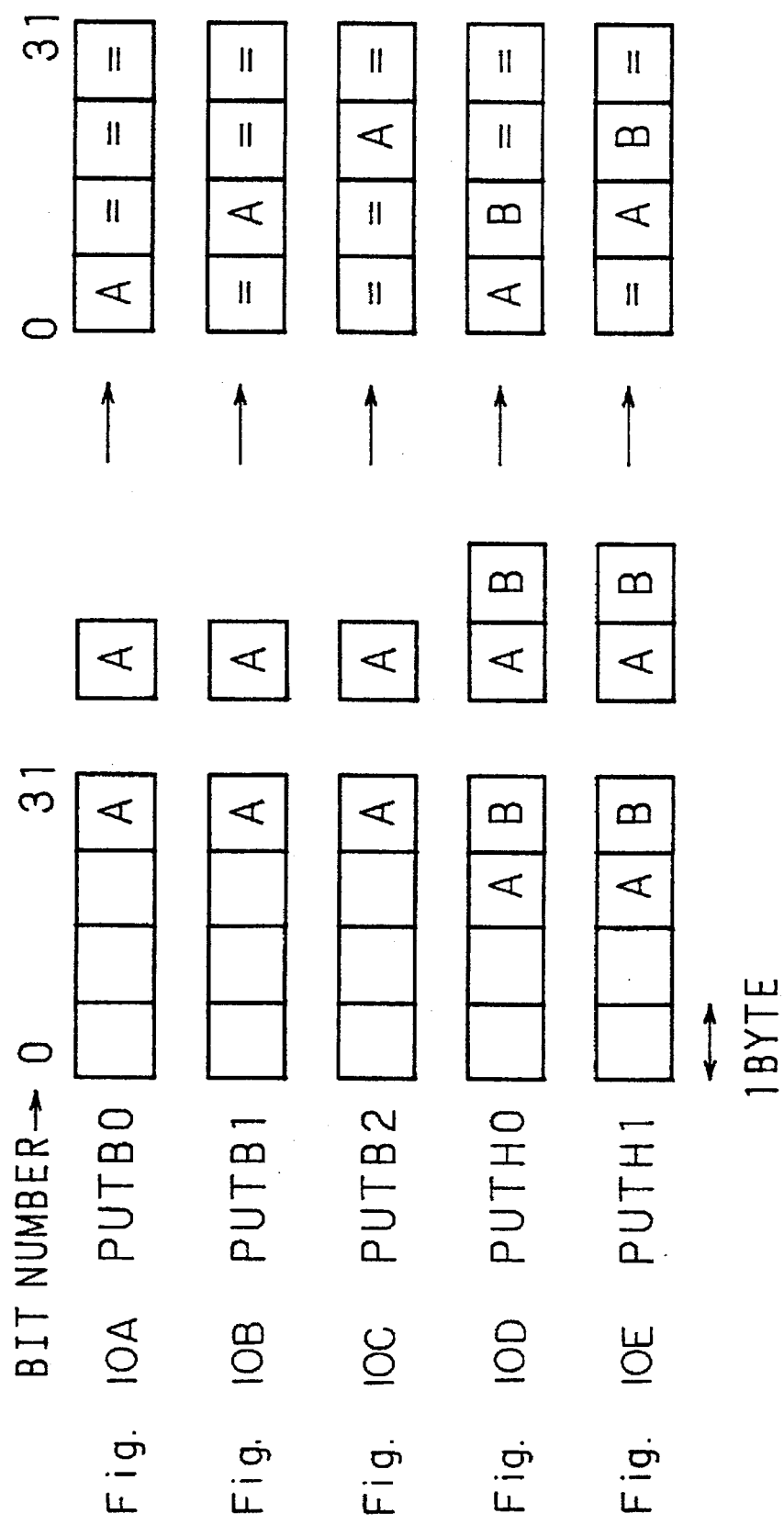

Fig. 18

| INSTRUC-TION | SHIFT WIDTH (BIT) | SELECT OUTPUT CONTROL | | | |
|---|---|---|---|---|---|
| | | $C_1$ | $C_2$ | $C_3$ | $C_4$ |
| GETB0 | 24 | 1 | 1 | 1 | 0 |
| GETB1 | 16 | 1 | 1 | 1 | 0 |
| GETB2 | 8 | 1 | 1 | 1 | 0 |
| GETH0 | 16 | 1 | 1 | 0 | 0 |
| GETH1 | 8 | 1 | 1 | 0 | 0 |
| PUTB0 | 24 | 1 | 0 | 0 | 0 |
| PUTB1 | 16 | 0 | 1 | 0 | 0 |
| PUTB2 | 8 | 0 | 0 | 1 | 0 |
| PUTH0 | 16 | 1 | 1 | 0 | 0 |
| PUTH1 | 8 | 0 | 1 | 1 | 0 |

DATA PROCESSOR AND CONTROL CIRCUIT FOR INSERTING/EXTRACTING DATA TO/FROM AN OPTIONAL BYTE POSITION OF A REGISTER

This application is a continuation of application Ser. No. 08/245,792 filed May 19, 1994 now abandoned.

BACKGROUND OF THE INVENTION

1. Field of the Invention

The present invention relates to a data processor, more particularly to a data processor being provided with instructions capable of inserting and extracting data to and from optional bit area of a register, and to a control circuit therefor.

2. Description of the Related Art

At graphic processings in a printer or the like, it is often required to operate pixel data one by one byte.

Specifically, such operations as inserting pixel data at an optional byte position of a register and extracting pixel data from an optional byte position of the register are frequently carried out.

There are instructions to support such operations, for example, such as the EXBYTE, EXHW, EXHWS, INBYTE and INHW instructions of 32-bit microprocessor Am29000 series of AMD (Advanced Micro Devices Inc.).

FIG. 1 schematically shows formats of the instructions provided for the Am29000 series described above.

Instruction code of every instruction has a fixed length of 32 bits (4 bytes) with the head byte being the operation code.

The operation code is set to "0000101M" for the EXBYTE instruction 301, "0111110M" for the EXHW instruction 302, "01111110" for the EXHWS instruction 303, "0000110M" for the INBYTE instruction 304, and "0111100M" for the INHW instruction 305.

Only the EXHWS instruction has two operands, and all other instructions each have three operands. The second byte from the head byte of each format is used for specifying the destination, the third byte for source A and the last byte for source B (irrelevant to the EXHWS instruction wherein the last byte is reserved).

Any one of registers from 32 registers, number 0 through number 31, of a register file is specified as the source A operand and the destination operand.

Any one of registers from the registers, number 0 through number 31, or an 8-bit value is specified as the source B operand.

Operation of each instruction is illustrated in the schematic diagrams of FIG. 2 through FIG.

In FIG. 2 through FIG. 8, A1 through A4 represent the values of first byte through fourth byte of the source A operand, and B1 through B4 represent the values of first byte through fourth byte of the source B operand, respectively.

As shown in FIG. 2, the EXBYTE instruction stores the source B operand, with data "B4" at the lowest byte thereof being replaced by data "A2" located at a specified byte position of the source A operand, in the destination register.

As shown in FIG. 3, the EXHW instruction is a variation of the EXBYTE instruction with the size of data to be replaced by the instruction being changed from one byte to two bytes.

As shown in FIG. 4, the EXHWS instruction applies sign extension to 2-byte data located at a specified position of the source A operand into 32 bits, and stores it in the destination register.

As shown in FIG. 5, the INBYTE instruction stores the source A operand, with data "A2" located at a specified byte position thereof being replaced by data "B4" located at the lowest byte position of the source B operand, in the destination register.

As shown in FIG. 6, the INHW instruction is a variation of the INBYTE instruction with the size of data to be replaced by the instruction being changed from one byte to two bytes.

Position of the data to be operated in the source A operand is specified by a byte position field of an ALU status register.

Because the "instructions which insert and extract data to and from optional byte position of a register" provided on the data processor of the prior art specify the byte position with the value of a control register, it is necessary to set the byte position to be processed onto the control register before executing the instruction. This requires one or more additional instruction to be executed in addition to the intrinsic instructions for the intended operations, leading to increasing processing time and instruction code size.

Also because these instructions are capable of specifying only registers as data to be inserted and operands to be extracted, in the case where the data are stored in a memory, transferring the data between the register and the memory in advance is required. This makes it necessary to execute one or more extra instructions in addition to the intrinsic instruction of the operation, thus increasing the processing time and instruction code size similarly to the problem described above.

SUMMARY OF THE INVENTION

The invention has been made to solve the problems described above, and has an object of providing a data processor and its control circuit capable of executing "operation for inserting and extracting data to and from optional byte position of a register", and is capable of executing operations at a higher speed with shorter instruction size by having information which indicates the byte position included in the instruction code, thereby making it possible to specify the memory as well as the register as the destination of access in data insertion and extraction.

The data processor of the invention is so constructed to specify an optional bit area (an area determined by the value of the operation code part) on a destination register by decoding an instruction code which includes an operation code part, a source operand specifying part and a destination operand specifying part, and to insert source data located at a register or memory into the specified area, or to specify an optional bit area (an area determined by the value of the operation code part) on a source register by decoding the same, and to extract data from the specified area and store it in a destination (register or memory).

The control circuit of the data processor of the invention executes each step of the control operation as described above by means of a microprogram.

In the data processor of the invention, because byte position is specified in accordance to information for indicating the position of a byte which is included in the instruction code and to be inserted or extracted when executing "instructions which insert and extract data to and from optional byte position of a register", such operation can be done with a single instruction without need to provide additional instruction to set the information on the byte position which has been required in the prior art. Also because it can specify the memory besides the registers as the destination of data insertion and extraction, it is capable of executing such operations with a single instruction without transferring the data between the memory and the register in advance.

The above and further objects and features of the invention will more fully be apparent from the following detailed description with accompanying drawings.

BRIEF DESCRIPTION OF THE DRAWINGS

FIGS. 7A–7C are a schematic drawing illustrative of the formats of the GETxx instruction and the PUTxx instruction which are executed by the data processor of the invention;

FIGS. 8A–8F are a schematic drawing illustrative of the formats of operand specifying part of the GETxx instruction and the PUTxx instruction which are executed by the data processor of the invention;

FIGS. 9A–9E are a schematic drawing illustrative of the operation of the GETxx instruction which is executed by the data processor of the invention;

FIGS. 10A–10E are a schematic drawing illustrative of the operation of the PUTxx instruction which is executed by the data processor of the invention;

FIG. 18 is a table showing the relationship between the shift width of a shift circuit and a select output control signal during execution of the GETB0 instruction and the PUTB0 instruction by the data processor of the invention.

DESCRIPTION OF THE PREFERRED EMBODIMENTS

Figure 1:
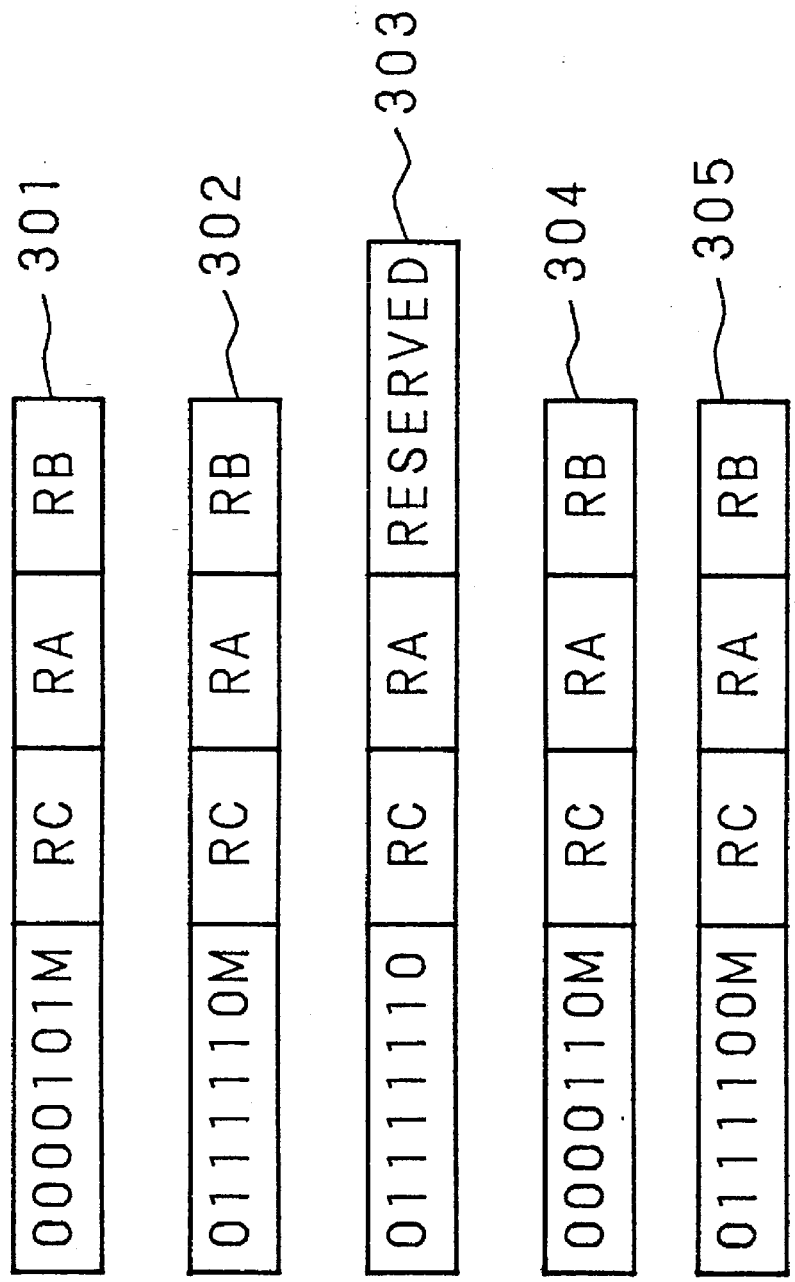
FIG. 1 is a schematic drawing illustrative of the format of instructions which insert and extract data to and from an optional byte position of a register provided in the data processor of the prior art.
Figure 2:
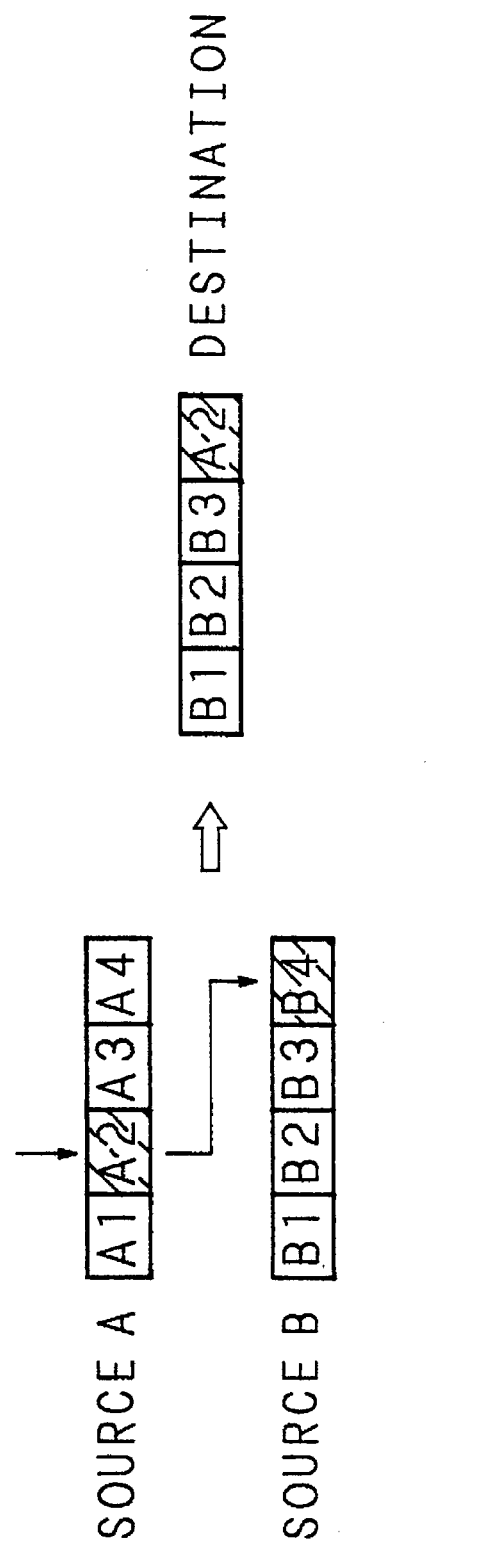
FIG. 2 is a schematic drawing illustrative of the state of data during execution of instructions which insert and extract data to and from an optional byte position of a register provided in the data processor of the prior art.
Figure 3:
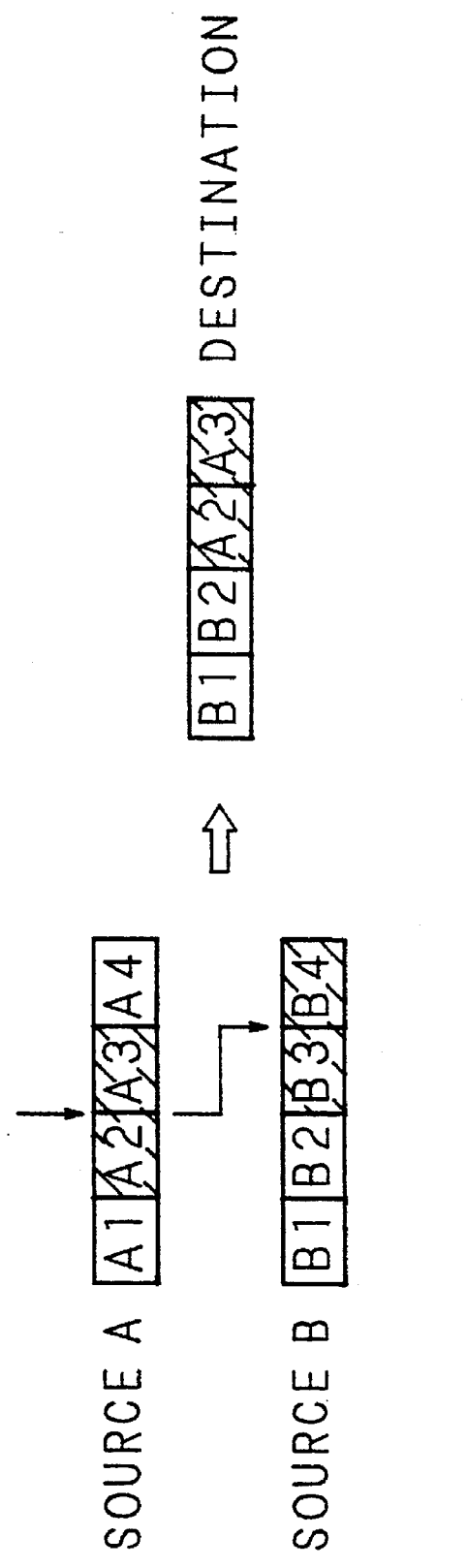
FIG. 3 is a schematic drawing illustrative of the state of data during execution of instructions which insert and extract data to and from an optional byte position of a register provided in the data processor of the prior art.
Figure 4:
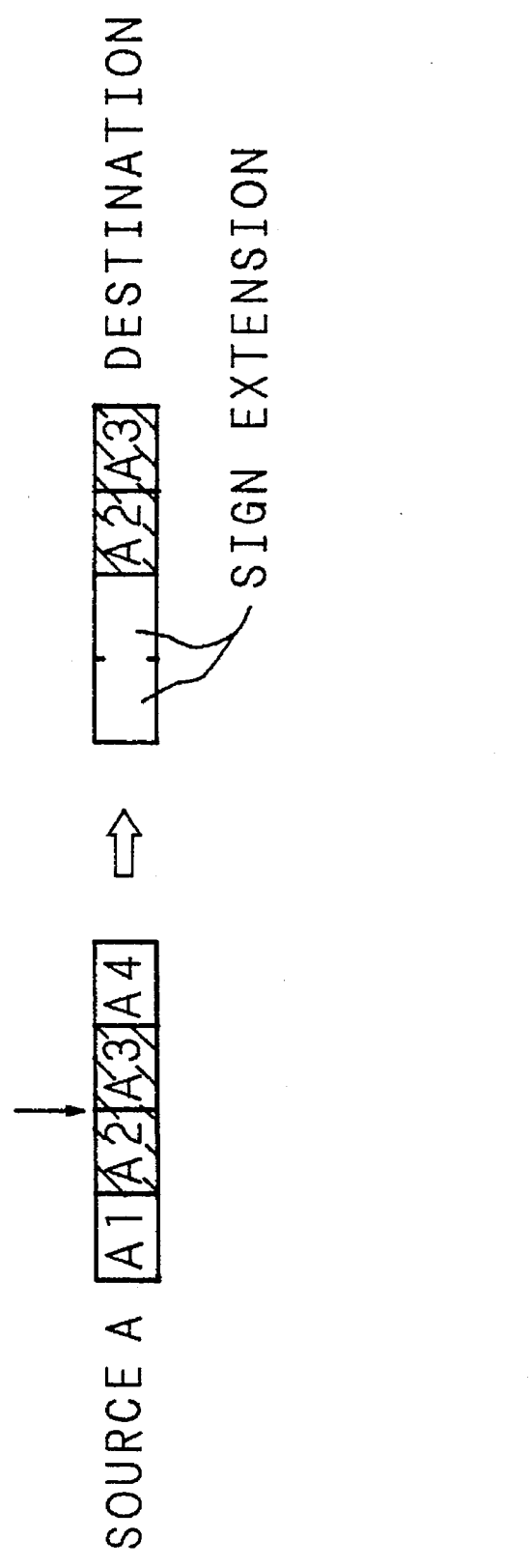
FIG. 4 is a schematic drawing illustrative of the state of data during execution of instructions which insert and extract data to and from an optional byte position of a register provided in the data processor of the prior art.
Figure 5:
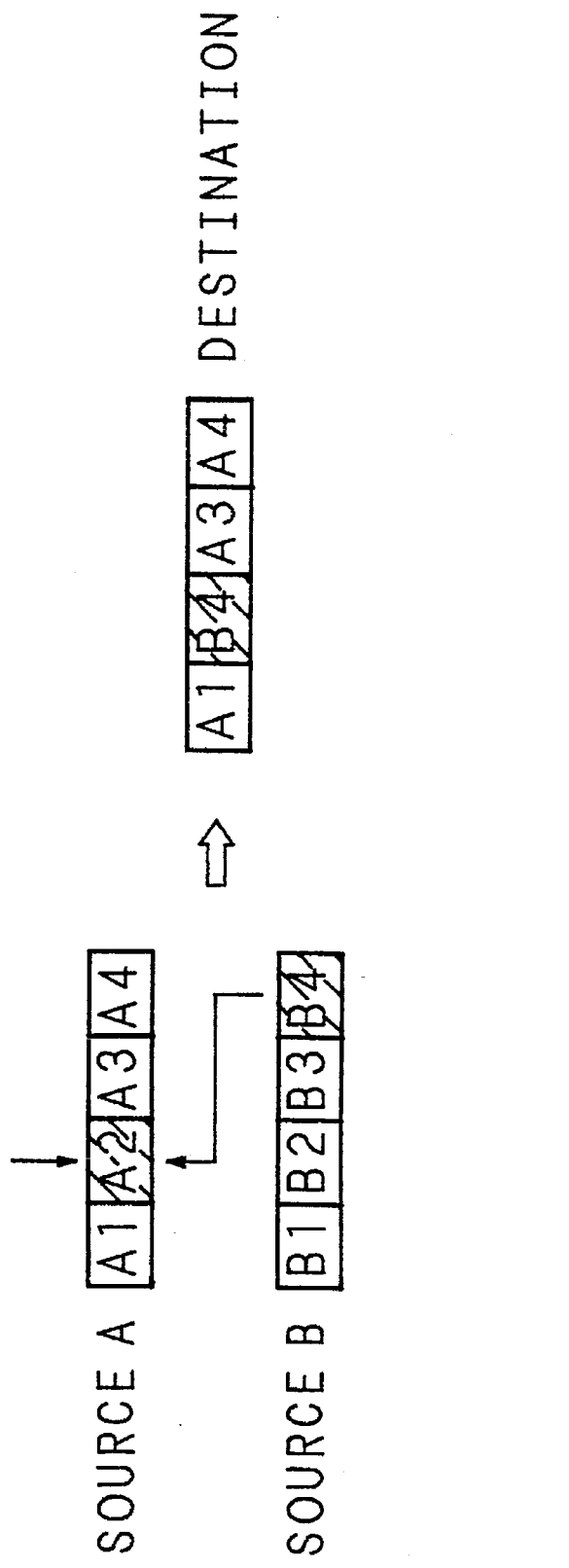
FIG. 5 is a schematic drawing illustrative of the state of data during execution of instructions which insert and extract data to and from an optional byte position of a register provided in the data processor of the prior art.
Figure 6:
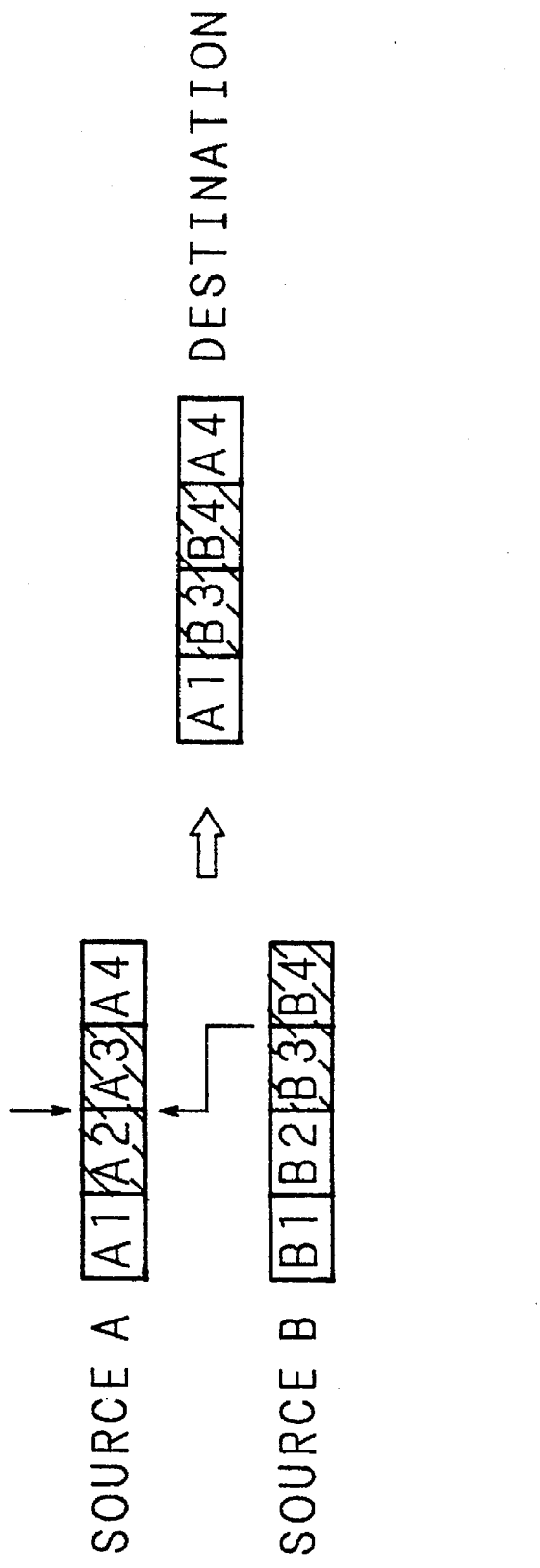
FIG. 6 is a schematic drawing illustrative of the state of data during execution of instructions which insert and extract data to and from an optional byte position of a register provided in the data processor of the prior art.

The present invention will now be described in detail below with reference to the accompanying drawings illustrative of the preferred embodiments.

FIG. 7 shows the formats of the GETxx instruction and the PUTxx instruction which are provided for the data processor of the invention.

The GETxx instruction is the one which extracts data from an optional byte position of a register. The PUTxx instruction is the one which inserts data at an optional byte position of the register.

In FIG. 7, numeral 401 designates the format of both instructions described above.

The format 401 of these instructions comprises, in order from the head byte, a first operation code part (1 byte) 4011, a source operand specifying part (1 byte) 4012, a source operand extension part (0 to 2 bytes) 4013, a second operation code part (1 byte) 4014, a destination operand specifying part (1 byte) 4015 and a destination operand extension part (0 to 2 bytes) 4016.

With the source operand specifying part 4012 and the destination operand specifying part 4015, such addressing modes of format as shown in the schematic drawing of FIG. 8 can be specified, with a 16-bit or 32-bit extension part being placed behind the operand specifying part depending on the addressing mode.

In FIG. 8, numeral 411 designates a format of a register direct addressing mode, numeral 412 designates a format of a register indirect addressing mode, numeral 413 designates a format of a 16-bit register relative indirect addressing mode, numeral 414 designates a format of a 32-bit register relative indirect addressing mode, numeral 415 designates a format of a 16-bit absolute addressing mode, and numeral 416 designates a format of a 32-bit absolute addressing mode.

The source operand of the GETxx instruction and the destination operand of the PUTxx instruction can specify only the register direct addressing mode, and the instructions are identified by the value of the second operation code part 4014.

FIG. 9 is a schematic diagram illustrative of the operation of the GETxx instruction.

In the example shown in FIG. 9, the source operand is a register and the destination operand is a register or memory.

The GETB0 instruction extracts the byte data "A" of the first byte from the head of the source operand, and replaces it with the lowest byte of the destination operand or writes it in the memory as byte data.

The GETB1 instruction extracts the byte data "B" of the second byte from the head of the source operand, and replaces it with the lowest byte of the destination operand or writes it in the memory as byte data.

The GETB2 instruction extracts the byte data "C" of the third byte from the head of the source operand, and replaces it with the lowest byte of the destination operand or writes it in the memory as byte data.

In other words, while the GETB0 instruction extracts the byte data of the first byte from the head of the source operand, the GETB1 instruction extracts the byte data of the second byte from the head of the source operand and the GETB2 instruction extracts the byte data of the third byte from the head of the source operand.

The GETH0 instruction extracts the two byte data "A" and "B" of the first and second bytes from the head of the source operand, and replaces them with the lowest two bytes of the destination operand or writes them in the memory as 2-byte data.

The GETH1 instruction extracts the two byte data "B" and "C" of the second and third bytes from the head of the source operand, and replaces them with the lowest two bytes of the destination operand or writes them in the memory as 2-byte data.

FIG. 10 is a schematic diagram illustrative of the operation of the PUTxx instruction.

In the example shown in FIG. 10, the source operand is a register or the memory and the destination operand is a register.

The PUTB0 instruction replaces the 1-byte data "A" being the lowest byte of the source operand or 1-byte data of the memory with the data of the first byte from the head of the destination operand.

The PUTB1 instruction replaces the 1-byte data "A" being the lowest byte of the source operand or 1-byte data of the memory with the data of the second byte from the head of the destination operand.

The PUTB2 instruction replaces the 1-byte data "A" being the lowest byte of the source operand or 1-byte data of the memory with the data of the third byte from the head of the destination operand.

The PUTH0 instruction replaces the 2-byte data "A" and "B" being the lowest two bytes of the source operand or 2-byte data of the memory with the data of the first and second bytes from the head of the destination operand.

The PUTH1 instruction replaces the 2-byte data "A" and "B" being the two bytes of the source operand or 2-byte data of the memory with the data of the second and third bytes from the head of the destination operand.

Figure 11:
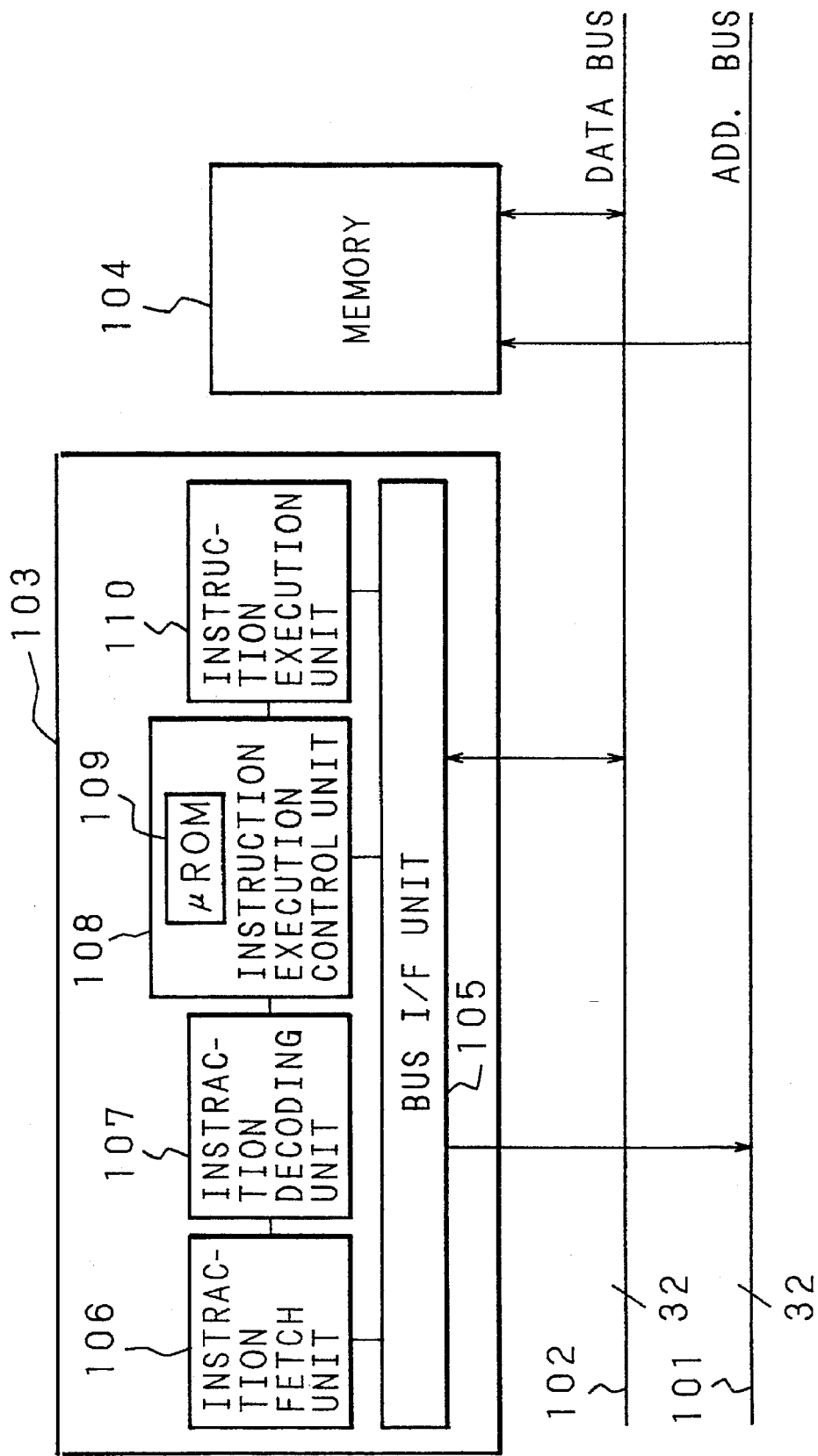
FIG. 11 is a block diagram illustrative of the overall constitution of the data processor of the invention.

FIG. 11 is a block diagram illustrative of the overall constitution of the data processor of the invention.

In FIG. 11, numeral 101 designates an address bus (32-bit), numeral 102 designates a data bus (32-bit), numeral 103 designates a processor and 104 designates a memory outside the processor 103.

The memory 104 and the processor 105 are connected with the address bus 101 and the data bus 102.

The processor 103 comprises a bus I/F unit 105, an instruction fetch unit 106, an instruction decoding unit 107, an instruction execution control unit 108, a micro ROM 109, an instruction execution unit 110, and the like.

The bus I/F unit 105 is connected to the memory 104 via the address bus 101 and the data bus 102, thereby to access to the memory 104 for instructions and data.

The instruction fetch unit 106 is connected to the bus I/F unit 105 and the instruction decoding unit 107, thereby to control the instruction fetch request to the bus I/F unit 105 and the output of the instruction which has been fetched by the bus I/F unit 105 to the instruction decoding unit 107.

The instruction decoding unit 107 is connected to the instruction fetch unit 106 and the instruction execution control unit 108, and decodes instructions received from the instruction fetch unit 106 thereby to output the information necessary for the instruction to the instruction execution control unit 108.

The instruction execution control unit 108 is connected to the bus I/F unit 105, the instruction decoding unit 107 and the instruction execution unit 110. In the instruction execution control unit 108, a micro ROM 109 which is a memory for storing the microprograms is built in. The instruction execution control unit 108 makes access to the micro ROM 109 according to the information which is outputted from the instruction decoding unit 107 thereby to fetch the microinstruction and decode it in order to output various control signals for the control of the instruction execution unit 110.

The instruction execution unit 110 is connected to the instruction execution control unit 108 and the bus I/F unit 105, to execute the instructions according to the control signals which are outputted from the instruction execution control unit 108.

Figure 12:
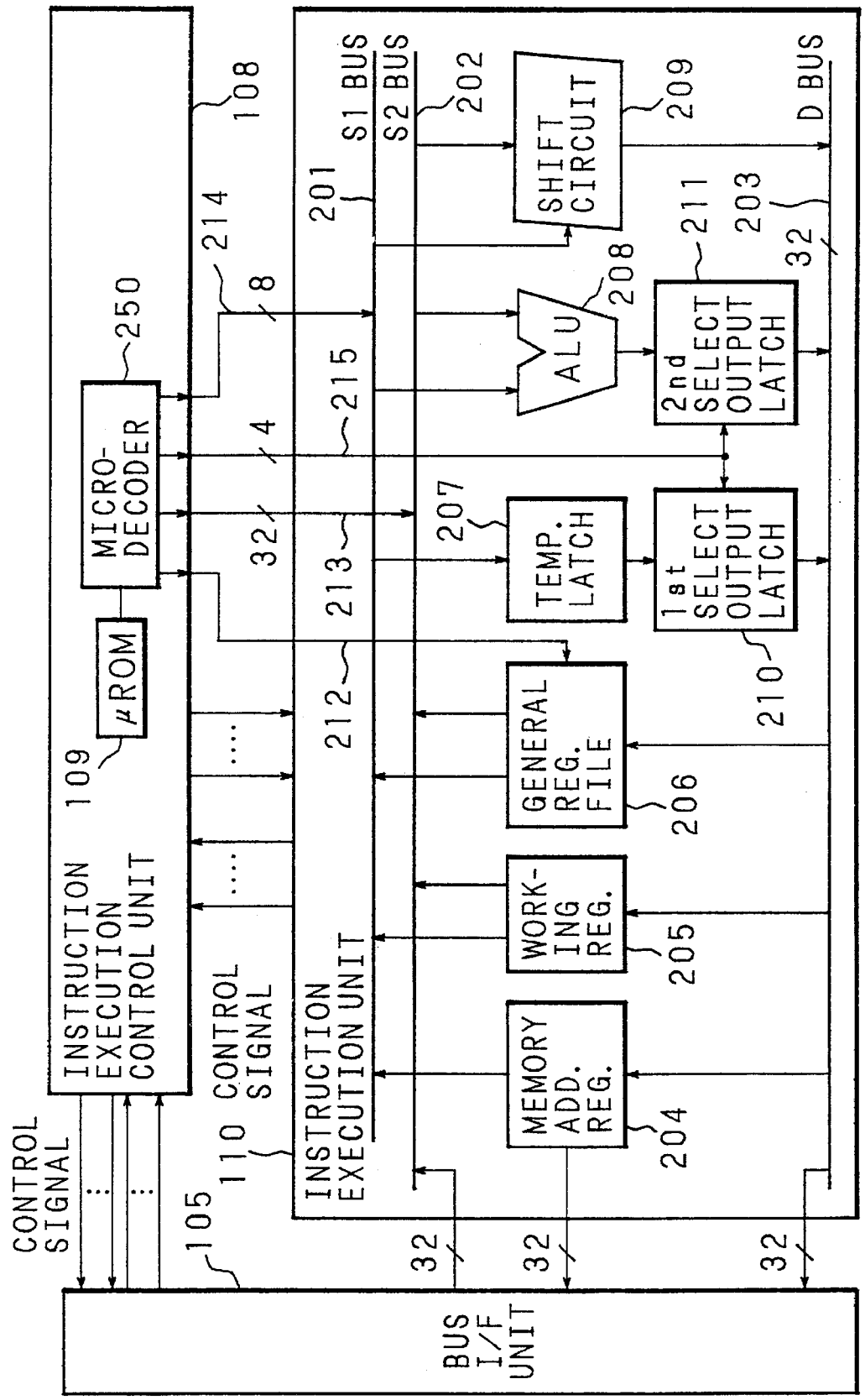
FIG. 12 is a block diagram illustrative of an example of detailed constitution of a primary portion of the data processor of the invention.

FIG. 12 is a block diagram illustrative of the detailed constitution of the instruction execution unit 110 shown in FIG. 11 and of the connection thereof to the bus I/F unit 105 and the instruction execution control unit 108.

In FIG. 12, numerals 201, 202, 203 designate internal buses of the instruction execution unit 110. Specifically, numeral 201 designates an S1 bus (32 bits), 202 designates an S2 bus (32 bits) and 203 designates a D bus (32 bits), which are used in data operations carried out, in the instruction execution unit 110.

Numeral 204 designates a memory address register (32 bits) which is provided for storing the memory address to be accessed. The memory address register 204 is provided with an input path from the D bus 203 and output paths to the S1 bus 201 and to the bus I/F unit 105.

Numeral 205 designates a working register which is provided with an input path from the D bus 203 and output paths to the S1 bus 501 and to the S5 bus 505.

Numeral 506 designates a general register file which is provided with 16 general registers of 32-bit. Each general register constituting the general register file 206 has an input path from the D bus 203 and output paths to the S1 bus 201 and to the S2 bus 502, and is accessed by means of signal (herein after to be called as a register number specifying signal) 212 which represents the register number given by the instruction execution control unit 108.

Numeral 207 designates a temporary latch (32 bits) which inputs the value of the S1 bus 201 and outputs only the byte thereof selected by a first select output circuit 210 to the D bus 203. Specifically, the temporary latch 207 inputs 4-byte (1-word) data from the S1 bus 201 and outputs only the byte data selected by the first select output circuit 210 to the D bus 203.

Numeral 208 designates an ALU which executes addition, subtraction and logical operations between data on the S1 bus 201 and the data on the S2 bus 202. It also has a function to directly output the data on the S1 bus 201 or the data on the S2 bus 202. Among the results of operations by the ALU 208, only the byte selected by a second select output circuit 211 is outputted to the D bus 203.

Numeral 209 designates a shift circuit which shifts, to the right or left, the data outputted from the S2 bus 202 according to the value of the lower 8 bits of the data given from the S1 bus 201, and outputs the data to the D bus 203.

The first select output circuit 210 selects a byte from among the output of the temporary latch 207 and outputs it to the D bus 203, as described above.

The second select output circuit 211 selects a byte from among the output of the ALU 208 and outputs it to the D bus 203, as described above.

The instruction execution unit 110 shown in FIG. 12 is connected to the bus I/F unit 105.

The bus I/F unit 105 read-accesses data from the memory 104 via the data bus 102 and outputs it onto the S2 bus 202, and inputs the write data from the D bus 203 and write-accesses it into the memory 104. Address held by the memory address register 204 is used for the address at which the bus I/F unit 105 makes access to the memory 104.

The instruction execution unit 110 is connected also to the instruction execution unit 108.

While the instruction execution unit 108 is provided with the micro ROM 109 which stores the microprograms as described previously, it is also provided with a microdecoder 250 which decodes the microprograms.

The microdecoder 250, by decoding the microprogram which is read from the micro ROM 109, outputs various information specified by the microinstruction, for example, the register number specifying signal 212 described previously, to the general register file 208, outputs a signal indicating a 8-bit constant (hereinafter to be called as a constant data signal) 214 to the lower 8 bits of the S1 bus 201, outputs a signal specifying the value of an extension part of the instruction code (hereinafter to be called as an extension part data signal) 213 to the S2 bus 202, and outputs a select output control signal 215 to be described later to the select output circuits 210 and 211.

The instruction execution control unit 108 also generates a control signal to control the operations of the hardware of the instruction execution unit 110 and control signals such as access request signal to the bus I/F unit 105, and outputs them.

Figure 13:
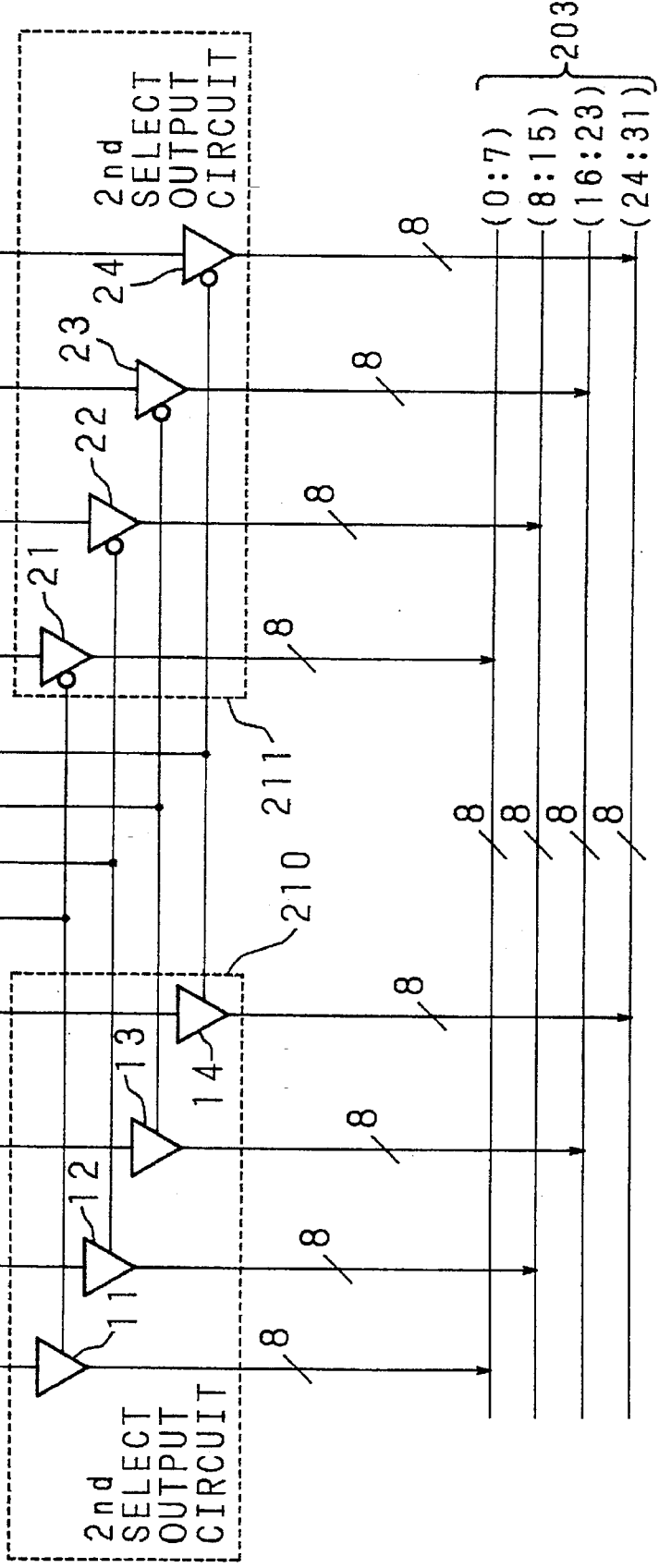
FIG. 13 is a block diagram illustrative of the detailed constitution of an output selector circuit of the data processor of the invention.

FIG. 13 is a circuit diagram illustrative of the constitution of the first select output circuit 210 and the second select output circuit 211 shown in FIG. 12.

The select output circuits 210, 211 are controlled according to select output control signals 218 (C1 through C4) which are outputted from the instruction execution control unit 108.

Specifically, the first select output circuit 210 comprises positive logic gates 11, 12, 13 and 14, and the second select output circuit 211 comprises negative logic gates 21, 22, 23 and 24. The gates 11 and 21 are controlled by the C1 of the select output control signal 215, the gates 12 and 22 are controlled by the C2 of the select output control signal 215, the gates 13 and 23 are controlled by the C3 of the select output control signal 215, and the gates 14 and 24 are controlled by the C4 of the select output control signal 215.

Output bits (0:7), (8:15), (16:23) and (24:31) of the temporary latch 207 are connected to bits (0:7), (8:15), (16:23) and (24:31) of the D bus via the gates 11, 12, 13 and 14, respectively.

Output bits (0:7), (8:15), (16:23) and (24:31) of the ALU 208 are connected to bits (0:7), (8:15), (16:23) and (24:31) of the D bus 203 via the gates 21, 22, 23 and 24, respectively.

Consequently, the gates 11, 12, 13 and 14 of the first select output circuit 210 turn on when the corresponding select output control signals C1, C2, C3 and C4 are "1", and the gates 21, 22, 23 and 24 of the second select output circuit 211 turn on when the corresponding select output control signals C1, C2, C3 and C4 are "0", respectively.

In other words, when the select output control signal C1 is "1", bit (0:7) of the output of the temporary latch 207 is connected to the bit (0:7) of the D bus 203 and, when the select output control signal C1 is "0", bit (0:7) of the output of the ALU 208 is connected to the bit (0:7) of the D bus 203.

When the select output control signal C2 is "1", bit (8:15) of the output of the temporary latch 207 is connected to the bit (8:15) of the D bus 203 and, when the select output control signal C2 is "0", bit (8:15) of the output of the ALU 208 is connected to the bit (8:15) of the D bus 203. When the select output control signal C3 is "1", bit (16:23) of the output of the temporary latch 207 is connected to the bit (16:23) of the D bus 203 and, when the select output control signal C3 is "0", bit (16:23) of the output of the ALU 208 is connected to the bit (16:23) of the D bus 203. When the select output control signal C4 is "1", bit (24:31) of the output of the temporary latch 207 is connected to the bit (24:31) of the D bus 203 and, when the select output control signal C4 is "0", bit (24:31) of the output of the ALU 208 is connected to the bit (24:31) of the D bus 203.

Figure 14:
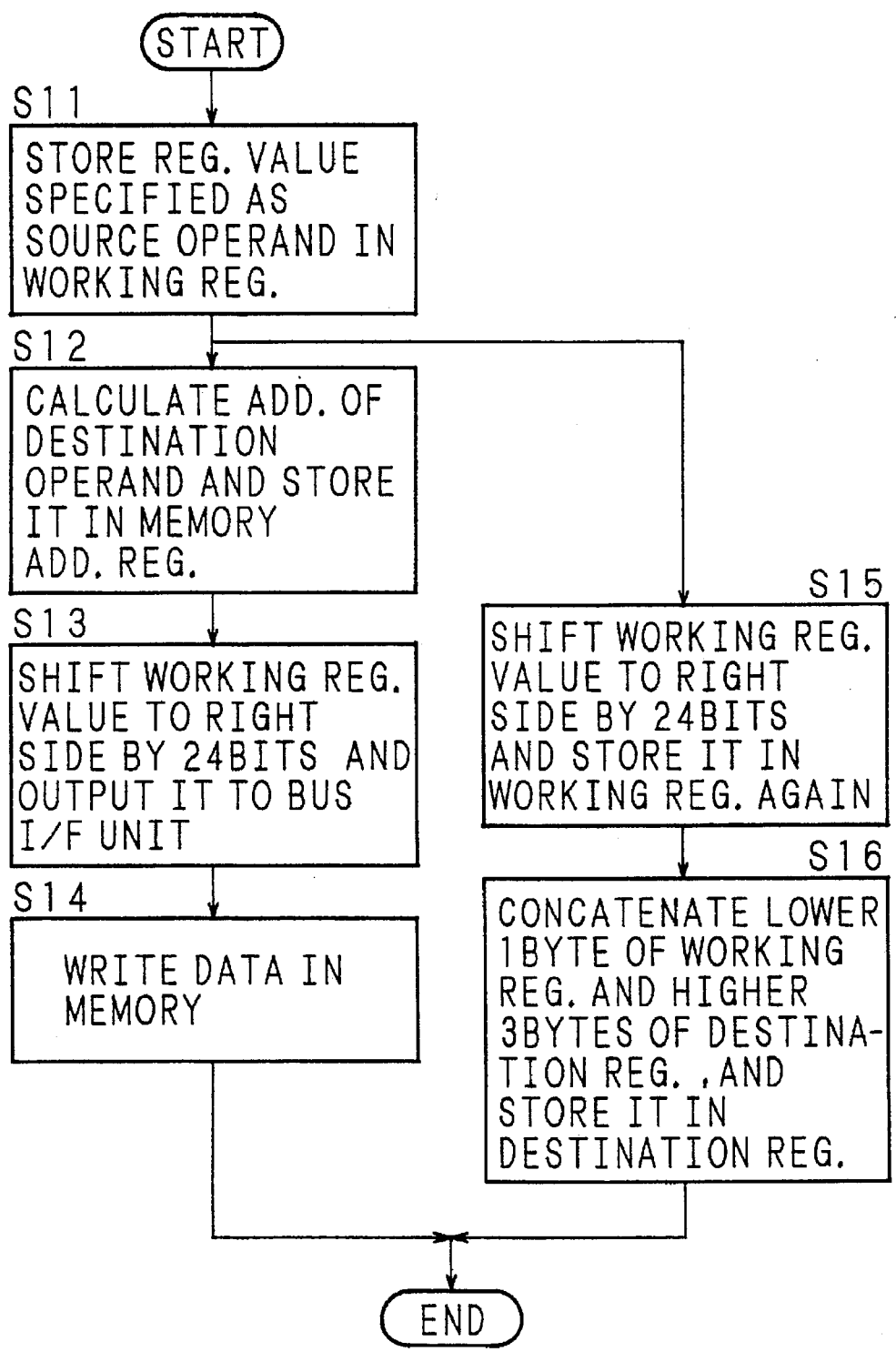
FIG. 14 is a flow chart illustrative of an execution sequence of the microprogram of the GETB0 instruction in the data processor of the invention.
Figure 15:
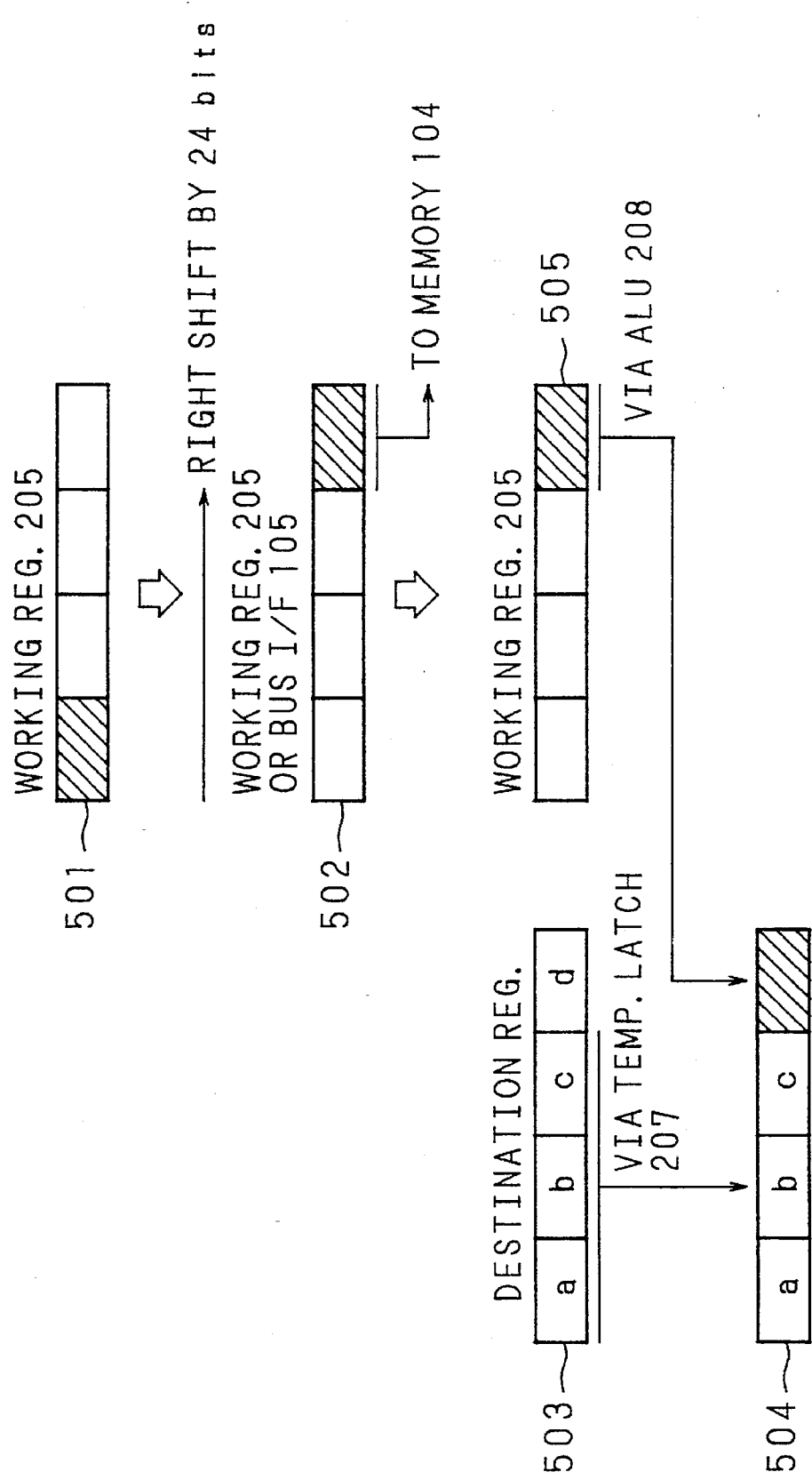
FIG. 15 is a schematic drawing illustrative of the state of data in the execution sequence of the GETB0 instruction in the data processor of the invention.

FIG. 14 shows a flow chart of the microprogram of the execution sequence of the GETB0 instruction, and FIG. 15 shows a schematic diagram illustrative of the state of data for the explanation of the operation thereof.

Figure 17:
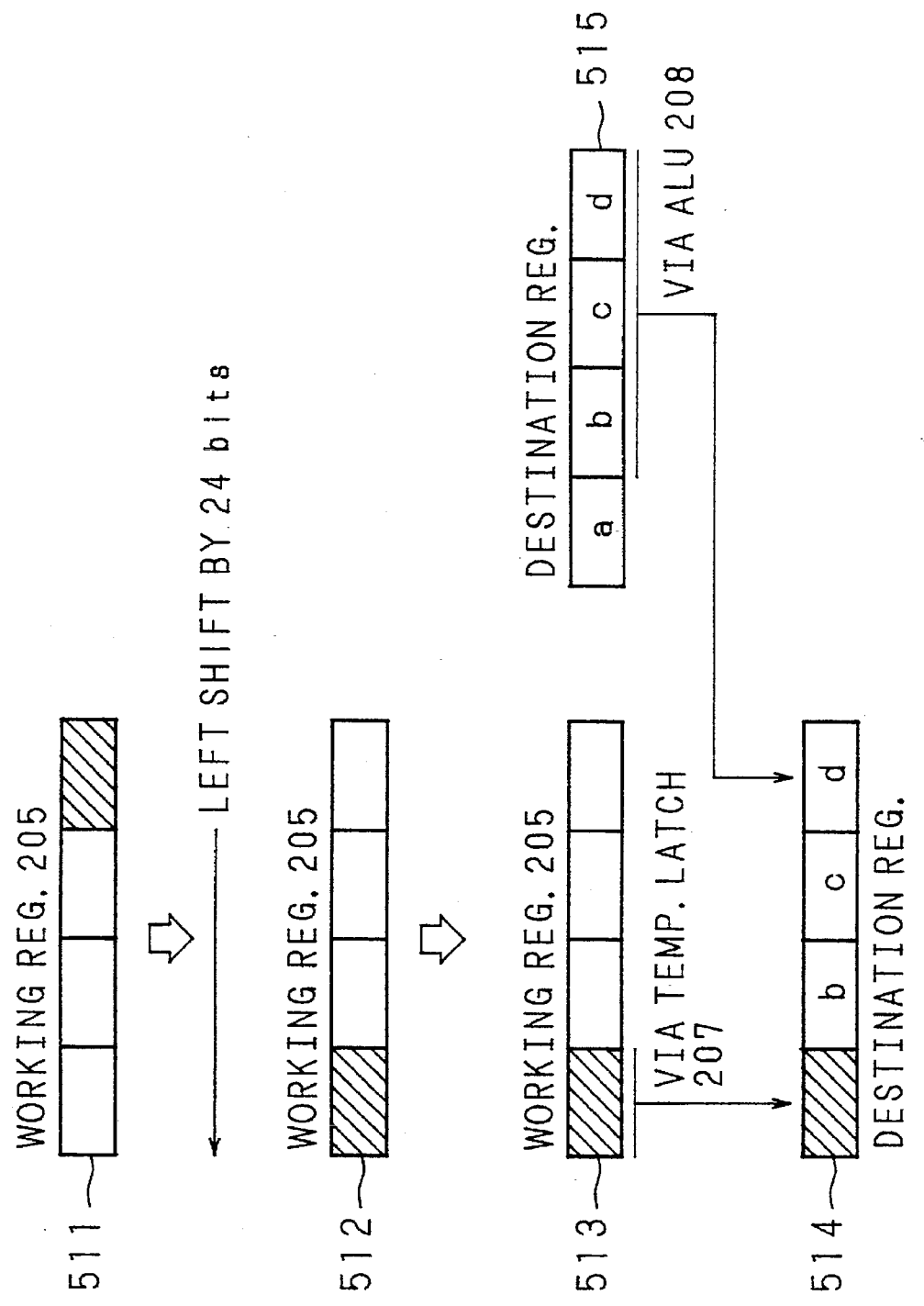
FIG. 17 is a schematic drawing illustrative of the state of data in the execution sequence of the PUTB0 instruction in the data processor of the invention.

FIG. 18 shows a flow chart of the microprogram of the execution sequence of the PUTB0 instruction, and FIG. 17 shows a schematic diagram illustrative of the state of data for the explanation of the operation thereof.

FIG. 18 is a table showing the relationship between the shift width when executing the GETxx instruction and the PUTxx instruction and the values of the select output control signals C1 through C4.

At first, the execution sequence of the GETB0 instruction will be described below with reference to FIG. 7, FIG. 14 and FIG. 15.

Instruction code of the GETB0 instruction fetched from the memory 104 is once taken into the instruction fetch unit 106 and is then sent to the instruction decoding unit 107 where it is decoded.

The instruction decoding unit 107 at first decodes the first operation code part 4011 and the source operand specifying part 4012 to generate microentry address for the source operand, and outputs it together with the register number Rn of the source operand specifying part 4012 to the instruction execution control unit 108. The instruction execution control unit 108 then ecodes the second operation code part 4014 and the destination operand specifying part 4015 to generate microentry address for the destination operand, and outputs it together with the register number Rn of the destination operand specifying part 4015 and the value of the extension part to the instruction execution control unit 108.

The microentry address for the destination operand varies depending on the addressing mode.

The instruction execution control unit 108 at first reads the microprogram for the source operand from the micro ROM 109 and decodes it to generate a control signal, and outputs it together with the register number specifying signal 212 for specifying the register number of the source operand to the instruction execution unit 110. When processing of the microprogram for the source operand is finished, then the instruction execution control unit 108 reads the microprogram for destination operand from the micro ROM 109 and decodes it to generate a control signal and outputs it together with the register number specifying signal 212 for specifying the register number of the destination operand and the constant data signal 214 to the instruction execution unit 110.

The instruction execution unit 110 at first sets the value of the general register, which is specified by the register number (in this case, the source register number) specifying signal 212 outputted from the instruction execution control unit 108, of the general register file 206 via the ALU 208 into the working register 205 according to the microprogram for the source operand, as shown by numeral 501 in FIG. 15 (step S11).

Then the instruction execution unit 110 executes the instruction in accordance to the microprogram for the destination operand. However, the processing varies a little depending on the addressing mode of the destination operand.

In the case where the destination is a register of the general register file 206, the instruction execution control unit 108 outputs a constant "24" to the S1 bus 201 according to the constant data signal 214, and the value of the working register 205 to the S2 bus 202 according to the extension part data signal 213. This causes the value outputted from the working register 205 to the S2 bus 202 to be shifted to the right by 24 bits in the shift circuit 209 as shown by numeral 502 in FIG. 15. The value obtained by this shift operation is sent via the D bus 203 to the working register 205 again as shown by numeral 505 in FIG. 15 (step S15).

Then, the value of the general register, which is selected by the register number (in this case, the destination register number) specifying signal 212 outputted from the instruction execution control unit 108, of the general register file 206 is sent via the S1 bus 201 to the temporary latch 207, and the value of the working register 205 is sent via the S2 bus 202 to the ALU 208. Now, when the select output control signal 215 is set to (C1, C2, C3, C4)=(1, 1, 1, 0), the value of output bit (0:23) of the temporary latch 207 is sent via the first select output circuit 210 to bit (0:23) of the D bus 203 and the value of output bit (24:31) of the ALU 208 is sent via the second select output circuit 211 to bit (24:31) of the D bus 203.

The value which is outputted to the D bus 203 as described above is stored in the general register, which is specified by the register number (in this case, the destination register number) specifying signal 212, of the general register file 206 as shown by numeral 504 in FIG. 15 (step S16).

The above operations finish the processing in the case where the destination is a register of the general purpose register file 206.

On the other hand, when the destination is the memory 104, the address of the destination operand is calculated by the ALU 208 by using the value of a general register, which is specified by the register number (in this case, the register number specified by the register indirect or register relative addressing mode) specifying number 212 outputted by the instruction execution control unit 108, of the general register file 206 and the extension part data signal 213, and is set in the memory address register 204 (step S12).

As the constant "24" is outputted to the S1 bus 201 and the value of the working register 205 is outputted to the S2 bus 202, value of the working register 205 is shifted to the right by 24 bits in the shift circuit 209 as shown by numeral 502 in FIG. 15. The value obtained by this shift operation is sent to the bus I/F unit 105 via the D bus 203 (step S13).

The bus I/F unit 105 writes the data which has been sent from the instruction execution unit 110 into the memory 104 by using the value of the memory address register 204 as the access address (step S14).

The above operations finish the processing in th case where the destination is the memory 104.

Although, execution sequence of the GETB0 instruction has been described, the microprogram for the destination operand varies from instruction to instruction, because of the difference of the second operation code part 4014. Other GETxx instructions are realized by selecting the values given in FIG. 18 for the shift width and the values of the select output control signals C1 through C4 by the corresponding microprograms.

Figure 16:
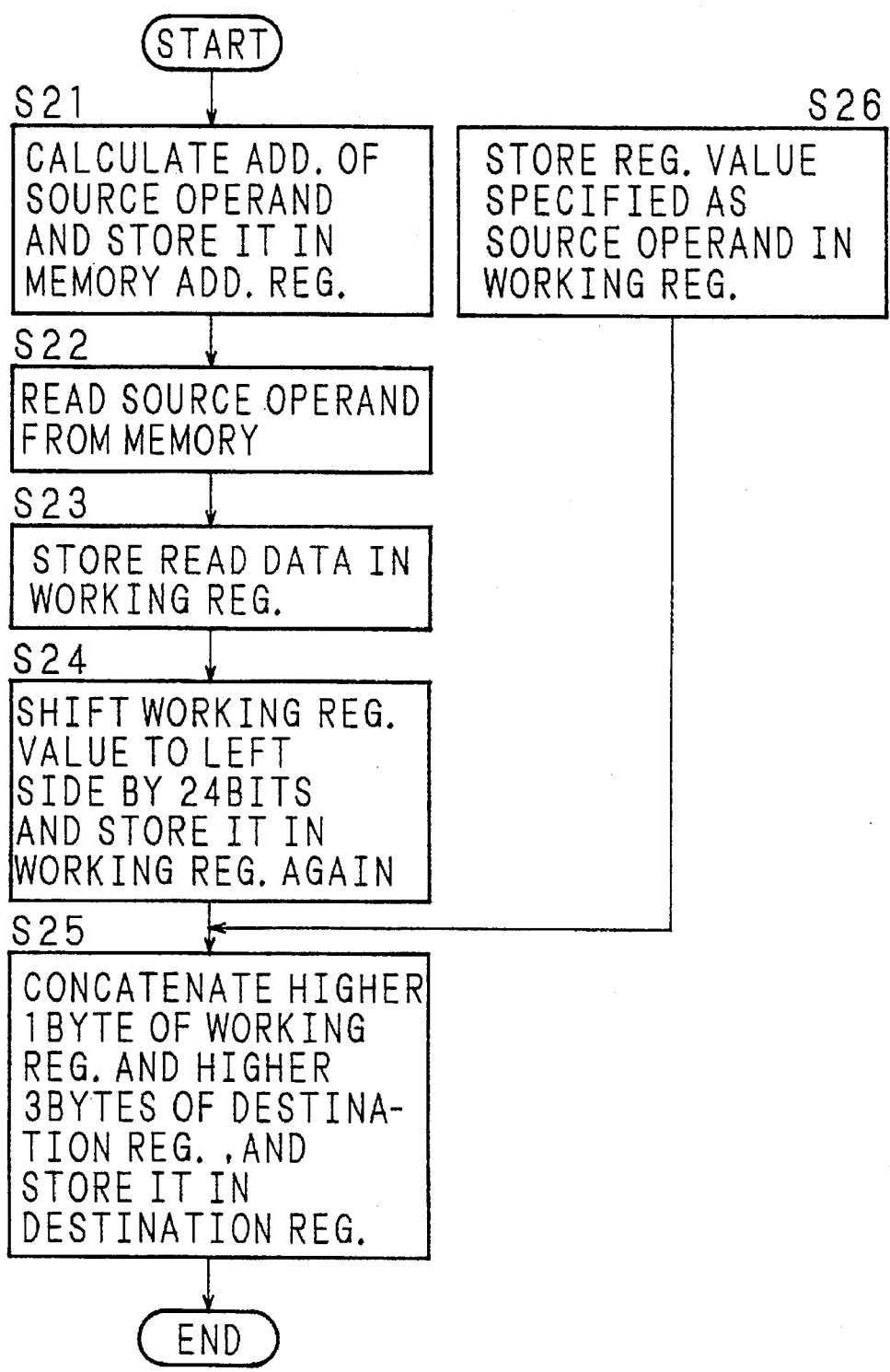
FIG. 16 is a flow chart illustrative of the execution sequence of the microprogram of the PUTB0 instruction in the data processor of the invention.

Next, the execution sequence of the PUTB0 instruction will be described below with reference to FIG. 7, FIG. 16 and FIG. 17.

The instruction code of the PUTB0 instruction which has been fetched from the memory 104 is once taken into the instruction fetch unit 106, then sent to the instruction decoding unit 107 where it is decoded.

The instruction decoding unit 107 at first decodes the first operation code part 4011 and the source operand specifying part 4012 to generate the microentry address for the source operand, and outputs it together with the register number Rn of the source operand specifying part 4012 and the value of the extension part to the instruction execution control unit 108.

The microentry address for the source operand varies depending on the addressing mode.

The instruction decoding unit 107 then decodes the second operation code unit 4014 and the destination operand specifying part 4015 to generate microentry address for the destination operand, and outputs it together with the register number Rn of the destination operand specifying part 4015 to the instruction execution control unit 108.

The instruction execution control unit 108 at first reads the microprogram for the source operand from the micro ROM 109 and decodes it to generate a control signal, and outputs it together with the register number specifying signal 212 for specifying the register number of the source operand and the extension part data signal 213 for specifying the value of the extension part to the instruction execution unit 110.

When processing of the microprogram for the source operand is finished, then the instruction execution control unit 108 reads the microprogram for destination operand and decodes it to generate a control signal and outputs it together with the register number specifying signal 212 which indicates the register number of the destination operand to the instruction execution unit 110.

The instruction execution unit 110 at first stores the source operand in the working register 205 by means of the microprogram for the source operand as shown by numeral 511 in FIG. 17. This processing varies a little depending on the addressing mode for the source operand.

In the case where the source operand is a register of the general register file 206, the value of the general register, which is selected by the register number (in this case, the source register number) specifying signal 212 outputted from the instruction execution control unit 108, of the general register file 206 is set via the ALU 208 into the working register 205 as shown by numeral 511 in FIG. 17 (step S26).

In the case where the source operand is the memory 104, address of the source operand is calculated by the ALU 208 by using the value of a general register, which is specified by the register number (in this case, the register number specified by the register indirect or register relative addressing mode) specifying signal 212 outputted by the instruction execution control unit 108, of the general register file 206 and the value of extension part data specified by the extension part data signal 213, and is set in the memory address register 204 (step S21). Then the bus I/F unit 105 reads data from the memory 104 by using the value of the memory address register 204 as the access address (step S22), and the data is sent through the S2 bus 202, the ALU 208 and the D bus 203 and stored in the working register 205 as shown by numeral 511 in FIG. 17 (step S23).

Processings described below are the same regardless of whether the source operand is a register of the general register file 206 or the memory 104.

When processing of the microprogram for the source operand is finished, a constant "24" is outputted to the S1 bus 201 and the value of the working register 205 is outputted to the $2 bus 202 by the microprogram for destination as shown by numeral 512 in FIG. 17, so that the value of the working register 205 is shifted to the left by 24 bits in the shift circuit 209. The value obtained by this shift operation is sent through the D bus 203 and set in the working register 205 as shown by numeral 513 in FIG. 17 (step S24).

Then, value of the working register 205 is inputted to the temporary latch 207 via the S1 bus 201 and value of a general register, which is specified by the register number (in this case, the destination register number) specifying signal 212 outputted from the instruction execution control unit 108, of the general register file 206, as shown by numeral 616 in FIG. 17, is inputted to the ALU 208 via the S2 bus 202. As the select output control signal 215 is set as (C1, C2, C3, C4)=(1, 0, 0, 0), output bit (0:7) of the temporary latch 207 is sent via the first select output circuit 210 to bit (0:7) of the D bus 203 and output bit (8:31) of the ALU 208 is sent via the second select output circuit 211 to bit (8:31) of the D bus 203.

Then, the value which is outputted to the D bus 203 is stored in a general register, which is specified by the register number (in this case, the destination register number) specifying signal 212, of the general register file 206 as shown by numeral 514 in FIG. 17 (step S26).

The above operations finish the processing of the PUTB0 instruction.

Although execution sequence of the PUTB0 instruction has been described, the microprogram for the destination operand varies from instruction to instruction, because of the difference of the second operation code part 4014. Other PUTxx instructions are realized by selecting the values given in FIG. 18 for the shift width and the value of the select output control signal by means of the corresponding microprograms.

Although the second select output circuit 211 which sends the output of the ALU 208 selectively to the D bus 203 is provided in the above embodiment, further higher speed of processing can be obtained by providing a similar select output circuit for the output of the shift circuit 209 instead of the above and giving the shift width data directly to the shift circuit 209 instead of via the S1 bus 201 so that shift and concatenation of the data are carried out at the same time.

It is a matter of course that the data processor of the invention of such a constitution as described above may also be constituted in the form of a one-chip microprocessor.

As described in detail above, according to the data processor and its control circuit of the invention, because the information on the byte position to be accessed which is included in the instruction code in advance eliminates the necessity of setting the byte position information beforehand by means of another instruction, instructions to insert or extract data to or from an optional byte position of a register can be realized with high-speed and short instruction codes.

In the case where the data is inserted to or extracted from a memory, too, the data can be directly specified as the operand thereby making it possible to obtain similar effect without need to transfer the data between the register and the memory beforehand.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data processor for executing instructions which insert or extract data to or from an optional byte position of a register, the data processor comprising:

instruction decoding means for decoding a digital instruction code including a source operand specifying part, a destination operand specifying part, information specifying a byte position in the source operand and an operation specifying part and outputting a decoding result specifying a source data corresponding to said source operand specifying part, a memory or destination register corresponding to said destination operand specifying part, a position in the source data corresponding to said information specifying a byte position, and a length of the bit string to be inserted or extracted, comprising one or a plurality of bits, corresponding to said operation specifying part;

a memory and a register file having one or a plurality of registers, at least one of the memory and the one or a plurality of registers being specified as the destination operand by said decoding result;

instruction executing means, connected to said instruction decoding means and receiving said decoding result, for reading source data specified by said decoding result and inserting a bit string, the length of which is specified by said decoding result, into said source data at the position specified by said decoding result, and storing the resulting source data in the memory or register specified by said decoding result; and instruction executing controlling means, connected to said instruction executing means, for operating said instruction executing means when said operation specifying part decoded by said instruction decoding means is a predetermined code.

2. A data processor as set forth in claim 1, further comprising a memory, and wherein said decoding result specifies said memory as the source data.

3. A data processor as set forth in claim 1, wherein said decoding result specifies at least one register of said register file as the source data.

4. A data processor as set forth in claim 1, further comprising:

means for writing the original value of the corresponding bits of the destination data onto the bits other than the bit string inserted by said instruction executing means in the destination data.

5. A data processor as set forth in claim 1, wherein said decoding result specifies one of n number of parts which are made by equally dividing the bit string of the source data.

6. A data processor as set forth in claim 1, wherein said decoding result specifies a plurality of consecutive parts of n number of parts which are made by equally dividing the bit string of the destination data.

7. A data processor as set forth in claim 1, wherein said decoding result specifies a one of n number of parts which are made by equally dividing the bit string of the destination data.

8. A data processor for executing instructions constituted by a digital instruction code including an operation specifying part, a source operand specifying part, information specifying a byte position in the source operand and a destination operand specifying part, comprising:

instruction decoding means for decoding a digital instruction code, including a source operand specifying part of the instruction code, information specifying a byte position of said source operand, a destination operand specifying part of the instruction code and an operation specifying part of the instruction code and outputting a decoding result specifying a memory or source register corresponding to said source operand specifying part, a destination register corresponding to said destination operand specifying part, a position in the source data corresponding to said information specifying a byte position, and a length of the bit string to be inserted or extracted, comprising one or a plurality of bits, corresponding to said operation specifying part;

a memory and a register file having one or a plurality of registers, at least one of the memory and the one or a plurality of registers being specified as the source operand by said decoding result;

instruction executing means, connected to said instruction decoding means and receiving said decoding result, for writing and storing data in the destination specified by said decoding result and extracting a bit string, located at a position specified by said decoding result, from the data stored in said source operand specified by said decoding result; and instruction executing controlling means, connected to said instruction executing means, for operating said instruction executing means to write the bit string extracted by said instruction executing means into a position, which is specified by said decoding result, in the destination specified by said decoding result, when said operation specifying part decoded by said instruction decoding means is a specified code.

9. A data processor as set forth in claim 8, further comprising a memory, and wherein said decoding result wherein said decoding result specifies said memory as the storing destination.

10. A data processor as set forth in claim 8, wherein said decoding result specifies at least one register of the register file as the storing destination of the data.

11. A data processor as set forth in claim 8, further comprising:

means for writing the original value of the corresponding bits of the destination data onto the bits other than the bit string written by said instruction executing means in the data of the storing destination specified by said decoding result.

12. A data processor as set forth in claim 8, wherein said decoding result specifies one of n number of parts which are made by equally dividing the bit string of the data stored in the source register.

13. A data processor as set forth in claim 8, wherein said decoding result specifies a plurality of consecutive parts of n number of parts which are made by equally dividing the bit string of the data stored in the source register.

14. A control circuit for a data processor, comprising:

a first register for storing and outputting source data;

a second register for storing and outputting destination data;

shifting means, connected to said first register, for obtaining data by shifting the source data outputted from said first register; and data writing means, connected to said second register and to said shifting means, for writing bits of the destination data outputted from said second register and bits of the data obtained by said shifting means, selectively in said second register;

wherein operation is carried out by a plurality of steps for:

reading a first data from said first register and inputting it to said shifting means;

controlling said shifting means to shift said first data from the least significant bit toward the most significant bit by i bits, and to generate a second data; and controlling said data writing means to write a bit string of j bits from the "i+1"th bit from the least significant bit up to the "i+j"th bit of the second data into a bit string of j bits from the "i+1"th bit from the least significant bit up to the "i+j"th bit of said second register, and to write the original values of the respective bits again in other bits of said second register.

15. A control circuit for a data processor as set forth in claim 14, wherein said each step is carried out according to microprograms stored in a memory connected to said data processor.

16. A control circuit for a data processor, comprising:

a first register for storing and outputting source data;

a second register for storing and outputting destination data;

shifting means, connected to said first register, for shifting data outputted from said first register; and data writing means, connected to said second register and to said shifting means, for writing bits of the destination data outputted from said second register and bits of the data obtained by said shifting means, selectively in said second register;

wherein operation is carried out by a plurality of steps for:

reading a first data from said first register and inputting it to said shifting means;

controlling said shifting means to shift said first data from the most significant bit toward the most significant bit by m bits, and to generate a second data; and controlling said data writing means to write a bit string of n bits from the least significant but up to the "n"th bit of the second data into a bit string of n bits from the least significant bit up to the "n"th bit of said second register, and to write the original values of the respective bits again in other bits of said second register.

17. A control circuit for a data processor as set forth in claim 16, wherein said each step is carried out according to microprograms stored in a memory connected to said data processor.

* * * * *